(12) United States Patent
Howard, Jr. et al.

(10) Patent No.: US 7,283,997 B1
(45) Date of Patent: Oct. 16, 2007

(54) SYSTEM AND METHOD FOR RANKING THE RELEVANCE OF DOCUMENTS RETRIEVED BY A QUERY

(75) Inventors: Albert R. Howard, Jr., Sunnyvale, CA (US); Eric R. Koebler, Ben Lomond, CA (US); Wayne R. Loofbourrow, San Jose, CA (US)

(73) Assignee: Apple Inc., Cupertino, CA (US)

( * ) Notice: Subject to any disclaimer, the term of this patent is extended or adjusted under 35 U.S.C. 154(b) by 587 days.

(21) Appl. No.: 10/438,694

(22) Filed: May 14, 2003

(51) Int. Cl.
*G06F 17/30* (2006.01)
(52) U.S. Cl. ............... 707/5; 707/3; 707/6; 715/501.1
(58) Field of Classification Search ............... 701/1, 701/6; 707/3, 5, 10, 100; 715/501.1
See application file for complete search history.

(56) References Cited

U.S. PATENT DOCUMENTS

| | | |
|---|---|---|
| 5,557,468 A | 9/1996 | Ip |
| 5,828,689 A | 10/1998 | Epworth |
| 6,115,121 A | 9/2000 | Erskine |
| 6,128,118 A | 10/2000 | Marcenac |
| 6,374,241 B1 | 4/2002 | Lamburt et al. |
| 6,421,675 B1 | 7/2002 | Ryan et al. |
| 6,434,550 B1 | 8/2002 | Warner et al. |
| 6,490,577 B1 | 12/2002 | Anwar |
| 6,490,579 B1 | 12/2002 | Gao et al. |
| 6,522,818 B1 | 2/2003 | Aso et al. |
| 2003/0035618 A1 | 2/2003 | Watanabe |
| 2003/0069873 A1* | 4/2003 | Fox et al. ............... 707/1 |

FOREIGN PATENT DOCUMENTS

| | | |
|---|---|---|
| EP | 0426357 B1 | 4/1996 |
| EP | 0997751 A2 | 5/2000 |

OTHER PUBLICATIONS

Salton, Gerard, et al., "Improving Retrieval Performance by Relevance Feedback," Journal of the American Society for Information Science (JASIS) vol. 41, No. 4 (1990), pp. 288-297.

(Continued)

*Primary Examiner*—John Breene
*Assistant Examiner*—Giovanna B. Colan
(74) *Attorney, Agent, or Firm*—Fenwick & West LLP

(57) ABSTRACT

A computer system presents retrieved documents to a user, with documents most similar to documents in which the user previously showed high interest being ranked higher than other retrieved documents. The system compares a query vector with feedback query vectors, where each feedback query vector is associated with at least one user feedback vector, and each user feedback vector indicates an aggregate user interest in documents including terms associated with the user feedback vector. The system determines a feedback query vector that is most similar to the query vector, compares the document vectors with a user feedback vector associated with the most similar feedback query vector, and determines the document vector that is most similar to such user feedback vector. The document associated with the most similar document vector is ranked higher than the remaining retrieved documents, when presented to the user.

35 Claims, 5 Drawing Sheets

OTHER PUBLICATIONS

Leuski, Anton, "Relevance and Reinforcement in Interactive Browsing," In Proceedings of Ninth International Conference on Information and Knowledge Management (CIKM '00), Nov. 2000, pp. 119-126.

Haines, David, et al., "Relevance Feedback and Inference Networks," In Proceedings of the 16th Annual International ACM-SIGIR Conference on Research and Development in Information Retrieval, Pittsburgh, PA, Jun. 27-Jul. 1, 1993, pp. 2-11.

Bartolini, Ilaria, et al., "FeedbackBypass: A New Approach to Interactive Similarity Query Processing," In Proceedings of the 27th International Conference on Very Large Data Bases (VLDB 2001), Rome, Italy, Sep. 2001.

Presentations of the Text Retrieval Conferences [online], Apr. 11, 2003, [retrieved on Jul. 25, 2003]. Retrieved from the Internet: <URL: http://trec.nist.gov/pubs.html>.

Brenner, J. et al., "160 Gbit/s wavelength shifting and phase conjugation using periodically poled $LiNbO_3$ waveguide parametric converter," Electronics Letters, vol. 36, No. 21, Oct. 12, 2000, pp. 1788-1790.

Cimini, L.J., Jr., et al., "Optical Equalization for High-Bit-Rate Fiber-Optic Communications," IEEE Photonics Tehcnology Letters, vol. 2, No. 3 (Mar. 1990), pp. 200-202.

Cimini, Leonard J., Jr., et al., "Optical Equalization to Combat the Effects of Laser Chirp and Fiber Dispersion," Journal of Lightwave Technology, vol. 8, No. 5 (May 1990), pp. 649-659.

French, P.M.W., et al., "Tunable Group Velocity Dispersion Interferometer for Intracavity and Extracavity Applications," Optics Communications, vol. 57, No. 4 (Mar. 15, 1986), pp. 263-268.

Garthe, D., et al., "Low-loss dispersion equaliser operable over the entire erbium window," Electronics Letters, vol. 32 (1996), pp. 371-373.

Giles, C.R. et al., "Polarization-Independent Phase Conjugation in a Reflective Optical Mixer," IEEE Photonics Technology Letters, vol. 7, No. 1, Jan. 1995, pp. 126-128.

Gnauck, A.H., et al., "8-Gb/s-130 km Transmission Experiment Using Er-Doped Fiber Preamplifier and Optical Dispersion Equalization," IEEE Transactions Photonics Technology Letters, vol. 3, No. 12 (Dec. 1991), pp. 1147-1149.

Gnauck, A.H., et al., "Optical Equalization of Fiber Chromatic Dispersion in a 5-Gb/s Transmission System," IEEE Photonics Technology Letters, vol. 2, No. 8 (Aug. 1990), pp. 585-587.

Ishikawa, Hiroshi et al., "Wavelength Conversion Technologies for Photonic Network Systems," Fujitsu Sci. Tech. J., vol. 35, No. 1, Jul. 1999, pp. 126-138.

MacFarlane, Duncan L., et al., "Z-domain techniques in the analysis for Fabry-Perot étalons and multilayer structures," Journal of the Optical Society of America A, vol. 11, No. 1 (Jan. 1994), pp. 236-245.

Madsen, C.K., et al, "Optical All-Pass Filters for Phase Repsonse Design with and Applications for Dispersion Compensation," IEEE Photonics Technology Letters, vol. 10, No. 7 (Jul. 1998), pp. 994-996.

Madsen, C.K., et al., "A Tunable Dispersion Compensating MEMS All-Pass Filter," IEEE Photonics Technology Letters, vol. 12, No. 6 (Jun. 2000), pp. 651-653.

Madsen, C.K., et al., "Integrated All-Pass Filters for Tunable Dispersion and Dispersion Slope Compensation," IEEE Photonics Technology Letters, vol. 11, No. 12 (Dec. 1999), pp. 1623-1625.

Saleh, A.A.M., et al., "Two-Stage Fabry-Perot Filters as Demultiplexers in Optical FDMA LAN's," Journal of Lightwave Technology, vol. 7, No. 2 (Feb. 1989), pp. 323-329.

Skinner, Wilbert R., et al., "Optimization of a triple etalon interferometer," Applied Optics, vol. 26, No. 14 (Jul. 15, 1987), pp. 2817-2827.

Xie, Chongjin et al., "Efficiency and noise performance analysis of four-wave mixing between short optical pulses in semiconductor optical amplifiers," Optics Communications, vol. 164, 1999, pp. 211-217.

\* cited by examiner

| Feedback Query Vector | High Interest User Feedback Vector | Medium Interest User Feedback Vector |
|---|---|---|
| $FQ_1$ | $HUF_1$ | $MUF_1$ |
| $FQ_2$ | $HUF_2$ | $MUF_2$ |
| ⋮ | ⋮ | ⋮ |
| $FQ_N$ | $HUF_N$ | $MUF_N$ |

FIG. 4

SYSTEM AND METHOD FOR RANKING THE RELEVANCE OF DOCUMENTS RETRIEVED BY A QUERY

TECHNICAL FIELD

The present invention relates generally to information retrieval, and more specifically, to ranking the relevance of documents retrieved in response to a query.

BACKGROUND OF THE INVENTION

The number of documents available on the Internet is astronomical and increasing at a tremendous rate. Internet users search for documents of interest from this enormous corpus of documents by using dedicated search engines such as Google™ or web portals such as Yahoo™ that operate as a gateway to dedicated search engines. Such search engines are instances of information retrieval systems.

Conventional search engines perform a keyword search on their corpus of documents in response to a query input by a user and return search results typically corresponding to the keyword search. Some search engines also rank the returned search results according to a relevance determined based upon the degree of closeness of the documents in the search result to the query, when presenting the search results to a user. For example, conventional vector space search engines generate a query vector $Q=\{q_1, q_2, \ldots, q_R\}$ based upon the input query and document vectors $D_i=\{d_{i1}, d_{i2}, \ldots d_{iR}\}$ based upon the terms in the documents themselves and rank the search results according to some measure of the distance between the query vector Q and the document vector Di, for example, the cosine between the vectors Q and $D_i$. The query vector Q and the document vector Di are derived from terms in the corpus of documents. Here, the elements $\{q_1, q_2, \ldots, q_R\}$ in the query vector Q are the weights associated with the terms in the input query. In a typical keyword search, the elements $\{q_1, q_2, \ldots, q_R\}$ of the query vector Q are ones (1) or zeros (0) depending upon whether the corresponding term is included in the input query. Also, the elements $\{d_{i1}, d_{i2}, \ldots d_{iR}\}$ in the document vectors $D_i$ are the weights associated with the terms in the document, and each weight $\{d_{i1}, d_{i2}, \ldots d_{iR}\}$ is typically based on the frequency at which the term associated with the weight appears in the document and the frequency of the term in the corpus of documents. The basic operations of a vector space search system is described in Gerard Salton and Michael J. McGill, "Introduction to Modem Information Retrieval," McGraw-Hill, Inc., 1983.

Users of conventional search engines receive the search results, typically ranked according to the documents' relevance scores with respect to the user's search query. If the query was input to multiple search engines, the user will receive the individual search results returned by each search engine. Because each search engine has its own corpus of documents and its own scoring algorithm, the relevance scores for documents retrieved by each search engine are typically not comparable. For example, two search engines processing a query may score the same document with two entirely different relevance scores. Even then, the relevance scores cannot be directly compared (i.e., ranked) because they represent relevance only in the context of the other documents in the respective corpuses. For example, a document may receive a relevance score of 80% from one search engine, and could be the best scoring document in that search engine's corpus, and also receive a 95% relevance score from the other search engine and yet be only the $20^{th}$ best scoring document. Conversely, a document may receive the same relevance score from different search engines, and again have entirely different rankings within each set of search results. For this reason, there is a need for a method of ranking the documents retrieved from multiple search engines.

User feedback information may be useful in ranking the relevance of retrieved documents. The users may review some of the retrieved documents in the search results in detail as they appear relevant to the user, but may also ignore other documents in the search results as they appear, for example from their title or summary description, irrelevant to the user. Such feedback from the user regarding previous search results may be very useful in determining the relevance of future search results, as they indicate the type of documents that the user is interested in for certain queries. The user's feedback on previous search results may be useful in ranking future search results in a manner consistent with the user's interest in certain type of documents. Such user's feedback is particularly useful in ranking future search results, when the search results are retrieved from a plurality of search engines each having its own corpus of documents and returning search results based on different scales of relevance scores.

However, conventional search engines are not capable of taking into consideration the user's feedback given in response to previous searches when ranking future search results retrieved from a plurality of search engines.

Therefore, there is a need for an information retrieval method in which the user's feedback given in response to previous queries is taken into consideration when ranking future search results retrieved from a plurality of search engines. There is also a need for an information retrieval method in which documents retrieved in response to a query are ranked according to the user's feedback on previous search results.

SUMMARY OF INVENTION

The present invention provides a method of presenting to a user documents retrieved from a document collection by a plurality of search engines in response to a query, where the retrieved documents that are most similar to documents in which the user showed high interest are ranked higher than other retrieved documents when presented to the user. Each document is represented by a document vector in a vector space derived from terms in the document collection. The method also maintains a set of feedback query vectors and at least one user feedback vector associated with the feedback query vectors. Each feedback query vector corresponds to a previous query, where the user had given feedback on the documents retrieved in response to the previous query. Each user feedback vector indicates an aggregate user interest in documents including terms associated with the user feedback vector. In one embodiment, the method generates from the query a query vector in the vector space, and determines a feedback query vector that is most similar to the query vector. The method also determines the document vector that is most similar to the user feedback vector associated with the most similar feedback query vector. The method ranks the retrieved documents by assigning the document associated with the most similar document vector to a priority higher than the priority of the remaining retrieved documents, and presents the retrieved documents to the user according to the ranking. The remaining retrieved documents may be further ranked using the same method, or they can simply be ranked according to local relevance scores received from the search engines. In another embodiment, the method simply selects the document associated with the most similar document vector.

In this manner, the users will be able to review documents retrieved in response to a query in the order that is most likely to be of interest to the user based upon the user's feedback on documents retrieved in response to a previous query that is most similar to the current query. In addition, the users can review retrieved documents in the order of relevance without having the underlying search engines have any knowledge of the feedback given by the user or without making any modifications to the search engines or their associated databases.

In one embodiment, the user feedback vector comprises a set of vectors including a first user feedback vector and a second user feedback vector. The method compares the document vectors with the first user feedback vector and the second user feedback vector, and determines a first similar document vector that is most similar to the first user feedback vector and a second similar document vector that is most similar to the second user feedback vector. The first user feedback vector indicates the user's highest aggregate interest in documents including terms associated with the first user feedback vector, and the second user feedback vector indicates the user's second highest aggregate interest in documents including terms associated with the second user feedback vector. The retrieved documents are ranked such that the document associated with the first similar document vector is ranked with a first highest priority and the document(s) associated with the second similar document vector(s) are ranked with a second highest priority. The remaining retrieved documents may be further ranked using the same method, or they can simply be ranked according to local relevance scores received from the search engines. In another embodiment, the method of the present invention may be modified to select more than one document vectors closest to the first user feedback vector and more than one document vectors closest to the second user feedback vector. In such case, the method ranks such selected documents closest to the first user feedback vector with the first priorities and such selected documents closest to the second user feedback vector with the second priorities.

In this manner, the retrieved documents that are most similar to documents in which the user showed highest interest and second highest interest during review of documents retrieved in response to previous queries will be displayed with the first and second highest priority.

The present invention also provides a method of maintaining feedback query vectors and user feedback vectors associated with the feedback query vectors for presenting to a user documents retrieved from a document collection by a plurality of search engines in response to the user's query. The documents are represented by document vectors in a vector space derived from terms in the document collection. The method presents the retrieved documents to the user, and receives feedback from the user regarding the presented documents and the original query associated with the presented documents. The user feedback indicates one or more documents in which the user showed interest; these are designated as feedback documents. The method generates a feedback query vector in the vector space based upon the query, and also generates at least one user feedback vector associated with the feedback query vector. The user feedback vector represents the average of the document vectors corresponding to the feedback documents. The user may use the feedback query vector and the user feedback vector to rank documents retrieved in response to a future query, such that documents similar to the user feedback vector are presented with a higher priority than other retrieved documents.

In one embodiment, the user feedback vector comprises a set of vectors including a first user feedback vector and a second user feedback vector. The first user feedback vector indicates the user's highest aggregate interest in documents including terms associated with the first user feedback vector and the second user feedback vector indicates the user's second highest aggregate interest in documents including terms associated with the second user feedback vector. In another embodiment, the first user feedback vector corresponds to the average of document vectors associated with documents of which the full text was viewed by the user, and the second user feedback vector corresponds to the average of document vectors associated with documents of which the summary was viewed by the user.

The present invention also provides a system for presenting to a user documents retrieved from a document collection by a plurality of search engines in response to a query, where the retrieved documents that are most similar to documents in which the user previously showed high interest are ranked higher than other retrieved documents when presented to the user. The documents are represented by document vectors in a vector space derived from terms in the document collection. The system comprises a user feedback database and a processor module. The user feedback database stores feedback query vectors and user feedback vectors associated with the feedback query vectors. The user feedback vectors indicate the user's aggregate interests in selected documents including terms associated with the user feedback vectors, where the selected documents correspond to one or more of the documents retrieved in response to previous queries corresponding to the feedback query vectors. The processor module is coupled to the user feedback database, and (i) generates a query vector based upon the query, (ii) compares the query vector with the feedback query vectors stored in the user feedback, (iii) determines a most similar feedback query vector that is most similar to the query vector, (iv) compares the document vectors with at least one user feedback vector associated with the most similar feedback query vector, (v) determines one or more most similar document vector(s) that are most similar to the user feedback vector, (vi) ranks the retrieved documents by assigning the document(s) associated with the most similar document vector(s) to a priority higher than the priority of remaining retrieved documents, and (vii) presents the retrieved documents to the user according to the ranking. The remaining retrieved documents may be further ranked using the same method, or they can simply be ranked according to local relevance scores received from the search engines. In another embodiment, the processor simply selects the document(s) associated with the most similar document vector(s).

In this manner, the users will be able to review documents retrieved in response to a query in the order that is most likely to be of interest to the user based upon the user's feedback on documents retrieved in response to a previous query that is most similar to the current query. In addition, the users can review retrieved documents in the order of relevance without having the underlying search engines have any knowledge of the feedback given by the user or without making any modifications to the search engines or their associated databases.

The present invention may be embodied in various forms, including computer program products, methods, and systems, special or general purpose computing devices or apparatuses, online services or systems, user interfaces, and the like.

BRIEF DESCRIPTION OF THE DRAWINGS

FIG. 4 is a diagram illustrating the data structure of the feedback data storage, according to one embodiment of the present invention.

DETAILED DESCRIPTION OF EMBODIMENTS

Figure 1:
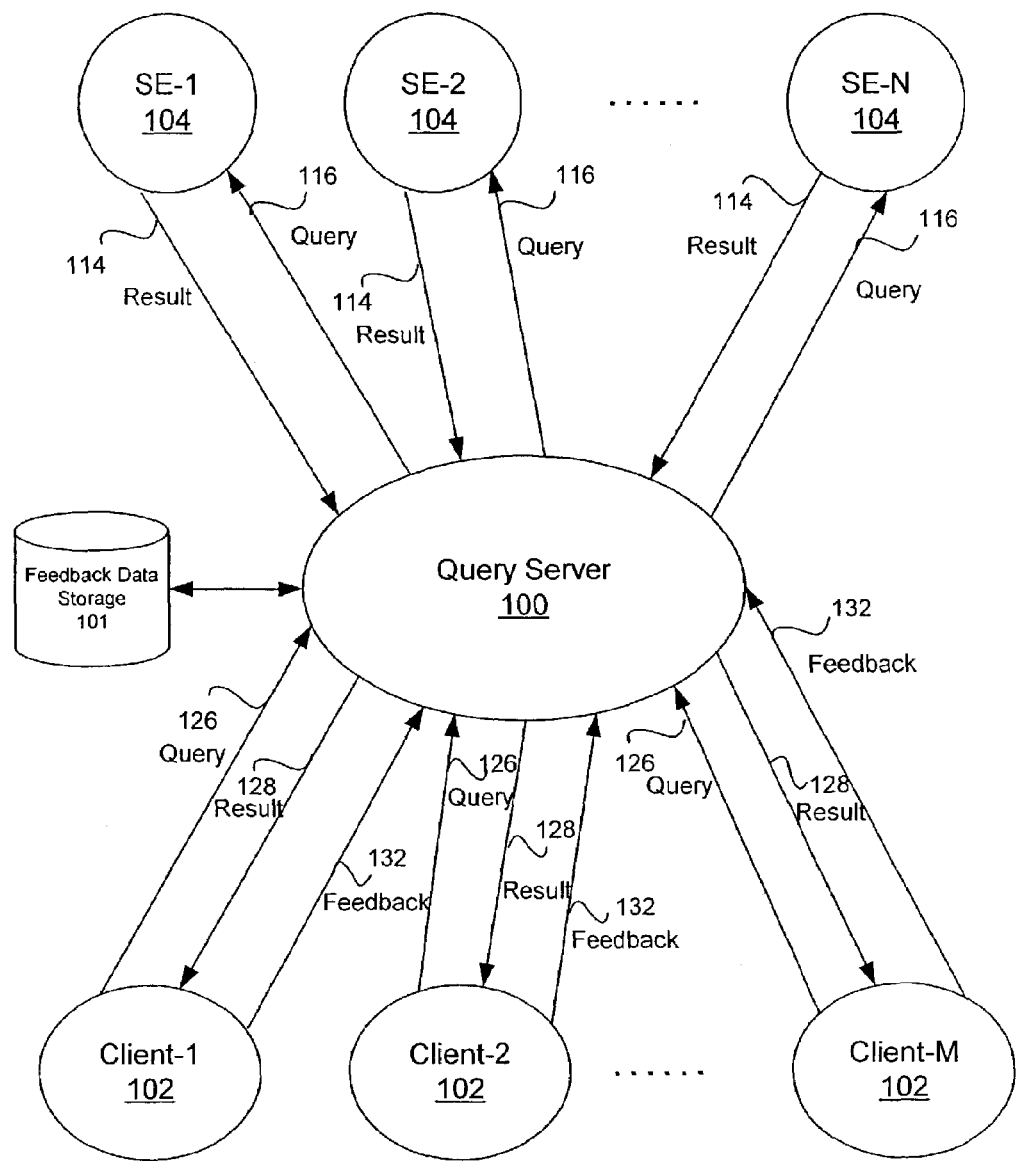
FIG. 1 is a diagram illustrating the architecture of an information retrieval system according to one embodiment of the present invention.

FIG. 1 is a diagram illustrating the architecture of an information retrieval system according to one embodiment of the present invention. The information retrieval system includes a query server 100 and a feedback data storage module 101. A plurality of client devices 102, Client-1, Client-2, . . . , Client-M, are coupled to the query server 100 to input queries, receive search results, and provide feedback on the search results. The query server 100 is also coupled to a plurality of search engines 104, SE-1, SE-2, . . . , SE-N.

The query server 100 receives queries 126 and also feedback 132 from the clients 102. The query server 100 also passes on search results 128 to the client devices 102. For example, the query server 100 may receive a query 126 from Client-1. The query server 100 passes on the received query 126 to a plurality of search engines 102 as queries 116. Each search engine 104 performs a search on its associated document corpus in response to the query 116 and generates individual search results 114, including documents ranked according to their local relevance to the queries 116. The local relevance to the queries 116 may be represented by local relevance scores corresponding to the degree of relevance of the documents to the queries 116.

The query server 100 receives the individual search results 114 from the search engines 104 along with the local relevance scores. The query server 100 merges the individual search results to generate a combined search result and returns the combined search result 128 to Client-1, which initiated that query 126. In merging the individual search results and generating the combined search result, the query server 100 ranks the documents of the combined search result using the user feedback data stored in the feedback data storage 101. Specifically, the query server 100 identifies a feedback query vector that is most similar to the current query and stored in the feedback data storage 101, and ranks the document associated with a document vector most similar to the user feedback vector associated with the identified feedback query vector as having the highest priority.

The user using Client-1 reviews the combined search result 128 including the plurality of ranked documents. The user may review the full text of some of the documents if they appear very relevant to the original query 126 and the user's interest. When the user reviews the combined search, the review of the full text of a document typically occurs when the user accesses the document, for example by selecting a link to the full text of the document in the combined search result. The user may also review just the summary of some of the documents if they appear somewhat relevant to the original query 126 and the user's interest, for example by selecting a link to a document summary or viewing a document summary presented to the user. The user may also choose to disregard other documents in the combined search result if they appear irrelevant to the original query 126 and the user's interest, by taking no action with respect to such documents.

Information regarding the user's action, including the actions of reviewing the full text of the document, reviewing the summary of the document, and inaction, are collected by the client 102 and returned to the query server 100 as feedback information 132. In another embodiment, information on inaction may be omitted from the feedback information 132. The feedback information 132 will also include the original query 126 on which the user's feedback is given. The query server 100 processes the feedback information 132 by generating feedback query vectors corresponding to the original queries and generating user feedback vectors corresponding to the documents on which feedback was given. The query server 100 stores the user feedback data in the feedback data storage module 101 for use in ranking documents retrieved in response to future queries.

The query server may be embodied in the form of any type of computer or electronic device including software for performing the methods of the present invention as described below with reference to FIGS. 2-3. The search engines 104 may be part of the query server 100 or may operate independently from the query server 100. The feedback data storage device 101 is embodied in the form of a database linked to the query server 100. The client devices 102 may be any type of computer and include conventional Internet browsers that can access the query server 100 via standard Internet protocols for allowing the user to input queries, review search results, and provide feedback on search results to the query server.

Figure 2:
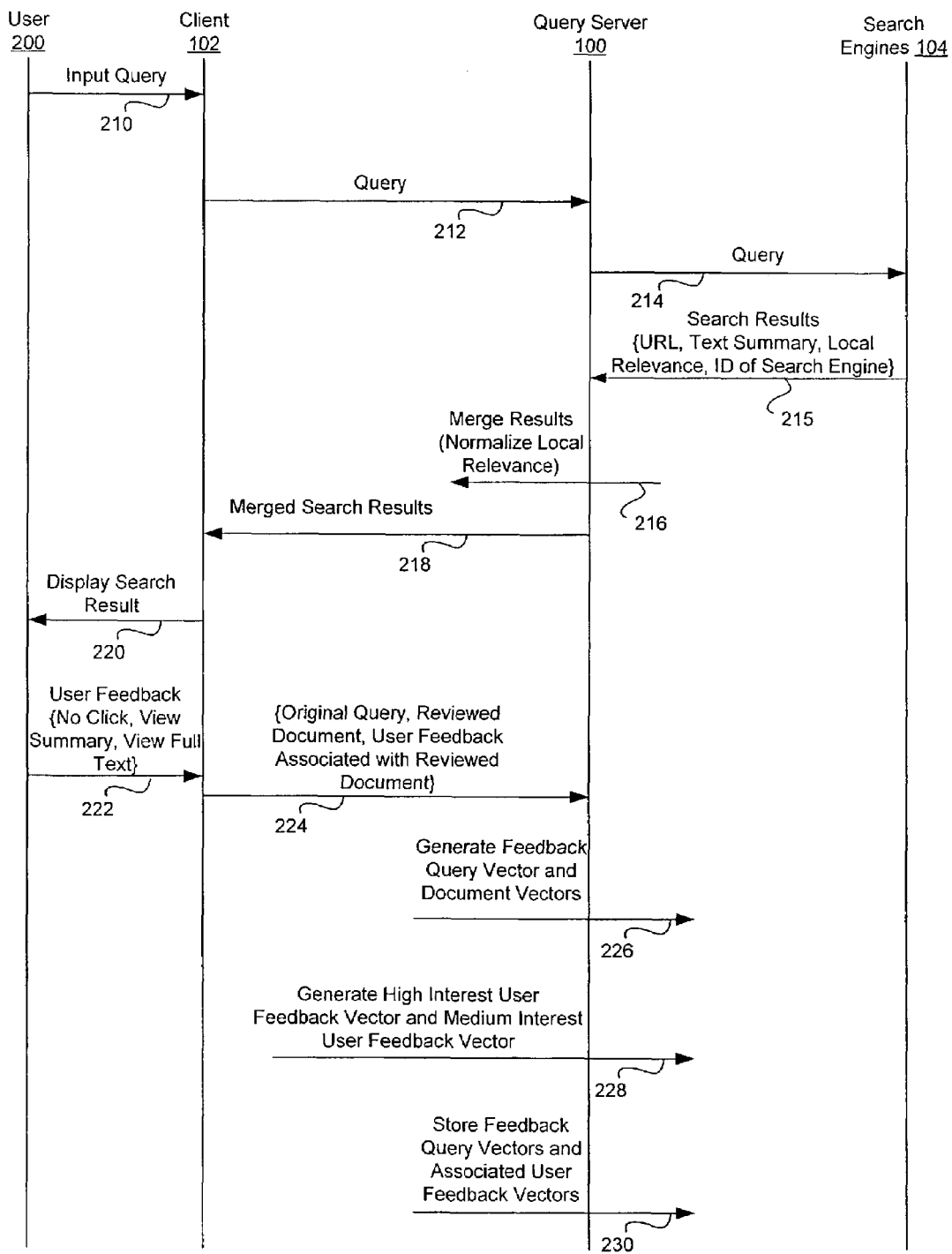
FIG. 2 is an interaction diagram illustrating the method of generating user feedback data according to one embodiment of the present invention.

FIG. 2 is an interaction diagram illustrating the method of generating user feedback data according to one embodiment of the present invention. FIG. 2 describes interaction among a user 200, the client device 102, the query server 100, and a plurality of search engines 104. Although the interaction diagram of FIG. 2 shows one client device 102, one skilled in the art would readily understand that any number of client devices coupled to the query server 100 may be used to provide feedback and generate user feedback data according to the present invention. The user feedback data generated according to the method described in FIG. 2 are stored in the feedback data storage module 101 and are used for ranking documents retrieved in response to queries input from client devices, so that the documents are presented to the users in the client devices in a manner that clearly shows documents that are most relevant to the query or the user's interest with a higher ranking.

Referring to FIG. 2, the method begins with the user 200 inputting a query 210 to the client device 102. The query 210 is typically in the form of a group of terms, such as keywords, a phrase, a partial sentence, or the like. In one embodiment, the query can be represented in the form of a query vector $Q=\{q_1, q_2, \ldots, q_R\}$. The elements $\{q_1, q_2, \ldots, q_R\}$ in the query vector Q are the weights of the terms in the input query. In a typical keyword search, $q_1, q_2, \ldots, q_R$ are ones (1) or zeros (0) depending upon whether the corresponding term is included in the input query. The client 102 passes on the query 212 to the query server 100. The query server 100 in turn passes the query 214 to a plurality of search engines 104 coupled to the query server 100, and the search engines 104 generate their own query vectors based upon the query.

The search engines 104 independently search their associated corpus of documents and return search results 215 to the query server 100. In one embodiment, the search results 215 may include (i) the URL of each document listed in the search results, (ii) a text summary of each listed documents, (iii) a local relevance score of each listed documents, and (iv) identifications of the search engines returning the search results. The query server 100 merges 216 the individual search results returned independently from the search engines 104 by combining the retrieved documents in the returned search results and normalizing their associated local relevance scores. The combined search results 218 may include, for example, (i) the URLs of the listed documents, (ii) the text summaries of the listed documents, (iii) the local relevance scores of the listed documents, and (iv) identifications of the search engines returning the search results.

The query server 100 provides the merged search results 218 to the client device 102, which displays 220 the merged search results to the user 200. The user may review the full text of some of the documents if they appear very relevant to the original query 210 and the user's interest by selecting the URL to the document. The user may also review the summary of some of the documents if they appear somewhat relevant to the original query 210 and the user's interest, by selecting the URL to the document summary. The user may also choose to disregard other documents in the combined search result if they appear irrelevant to the original query 210 and the user's interest, by taking no action with respect to such documents. The client 102 receives the user feedback information 222, i.e., information regarding the user's action, including review of the full text of the document, review of the summary of the document, and inaction. The client 102 sends 224 to the query server 100 the user feedback information 222, including (i) the original query 210 in response to which the search result 220 was provided to the user, (ii) the identification of the reviewed documents on which the user feedback was given by the user, and (iii) the particular user feedback (review of full text, review of summary, or inaction) associated with the reviewed documents. In another embodiment, information on inaction may be omitted from the user feedback information 222.

The query server 100 generates a feedback query vector FQ based on the original query 210 and feedback document vectors FDV based on the reviewed documents. The feedback query vector FQ is defined as: $FQ=\{fq_1, fq_2, \ldots, fq_R\}$, where the elements $\{fq_1, fq_2, \ldots, fq_R\}$ are the weights of the terms in the original query 210 and R is the number of terms associated with the feedback query vector FQ. In a typical keyword search, $fq_1, fq_2, \ldots, fq_R$ are ones (1) or zeros (0) depending upon whether the corresponding term is included in the original input query 210. The feedback document vectors $FDV_i$ are defined as: $FDV_i=\{fdv_{i1}, fdv_{i2}, \ldots, fdv_{iR}\}$, where the elements $\{fdv_{i1}, fdv_{i2}, \ldots, fdv_{iR}\}$ are the weights of the associated terms in the reviewed document, each weight representing the frequency at which the associated terms appear in the reviewed document, R is the number of terms associated with the feedback document vectors FDV and "i" corresponds to the number of feedback document vectors FDV.

The query server 100 also identifies the reviewed documents in which the user showed high interest (review of full text of document) and medium interest (review of summary of document). The feedback document vectors FDV associated with the documents in which the user showed high interest will be referred to as high interest feedback document vectors $HFDV_i$. The feedback document vectors FDV associated with the documents in which the user showed medium interest will be referred to as medium interest feedback document vectors $MFDV_i$. Both $HFDV_i$ and $MFDV_i$ are subsets of the feedback document vectors $FDV_i$. The query server 100 generates 228 a high-interest user feedback vector HUF based on the high-interest feedback document vectors $HFDV_i$ and a medium-interest user feedback vector MUF based on the medium-interest feedback document vectors $MFDV_i$. The high-interest user feedback vector HUF is calculated by averaging the high-interest feedback document vectors $HFDV_i$:

$$HUF = \sum_{i=1}^{m} \frac{1}{m} HFDV_i,$$

where m equals the number of documents in which the user expressed high-interest (review of full text of documents). Thus, the high-interest user feedback vector HUF represents the user's aggregate high interest in documents containing the terms corresponding to the weights defining the high-interest user feedback vector HUF. The medium-interest user feedback vector MUF is calculated by averaging the medium-interest feedback document vectors $MFDV_i$:

$$MUF = \sum_{i=1}^{p} \frac{1}{p} MFDV_i,$$

where p equals the number of documents in which the user expressed medium-interest (review of summary of documents). Thus, the medium-interest user feedback vector MUF represents the user's aggregate medium interest in documents containing the terms corresponding to the weights defining the medium-interest user feedback vector MUF. The query server 100 stores 230 the high-interest user feedback vector HUF and the medium-interest user feedback vector MUF along with the associated feedback query vector FQ in the feedback data storage 101 for use in ranking documents retrieved in response to future queries. The query server 100 can use the high-interest user feedback vector HUF and the medium-interest user feedback vector MUF in raking documents retrieved in response to future queries, in such a manner that documents similar to the previous documents in which the user showed high or medium interest are ranked higher when presented to the user.

In another embodiment, the feedback query vectors may also be consolidated if they are within a predetermined tolerance of closeness to each other, so that storage space may be saved. In such case, the method of the present invention stores the number of feedback query vectors that were combined to make up a consolidated feedback query vector, in order to allow an appropriate weighted average to be applied when combining the feedback query vectors.

In still another embodiment, the method may also accrete additional feedback on the same or similar query by updating an existing user feedback vector rather storing a new user feedback vector. In such case, the method of the present invention stores the number of feedbacks that were combined to generate the updated user feedback vector. The updated user feedback vector may be generated by applying an average or exponential decay with the most recent activity weighted higher or by any other averaging method, to ensure that changing user interests are accounted for.

FIG. 4 is a diagram illustrating the lookup table for the feedback data storage module 101. As shown in FIG. 4, the feedback data storage module 101 stores user feedback data in the form of a plurality of feedback query vectors $FQ_i$ (i=1, 2, ..., N; N is the number of feedback query vectors stored in the feedback data storage module 101) along with its associated high interest user feedback vector $HUF_i$ and medium interest user feedback vector $MUF_i$ Each feedback query vector $FQ_i$ corresponds to a previous query for which the user provided feedback on documents retrieved in response to the previous query. The user feedback data stored in the feedback data storage module 101 is used in ranking documents retrieved in response to future queries as described below with reference to FIG. 3. Although FIG. 4 is shown as storing a set of feedback query vectors and associated user feedback vectors for one user, the lookup table may also be modified to store sets of feedback query vectors and associated user feedback vectors for multiple users. In such case, the feedback query vectors and the associated user feedback vectors have identifiers for tying the feedback query vectors and the associated user feedback vectors to each the particular user associated with them. In still another embodiment, the feedback query vectors and the associated user feedback vectors may also be aggregated across multiple users rather than storing separate sets of feedback query vectors and the associated user feedback vectors for each user.

Figure 3:
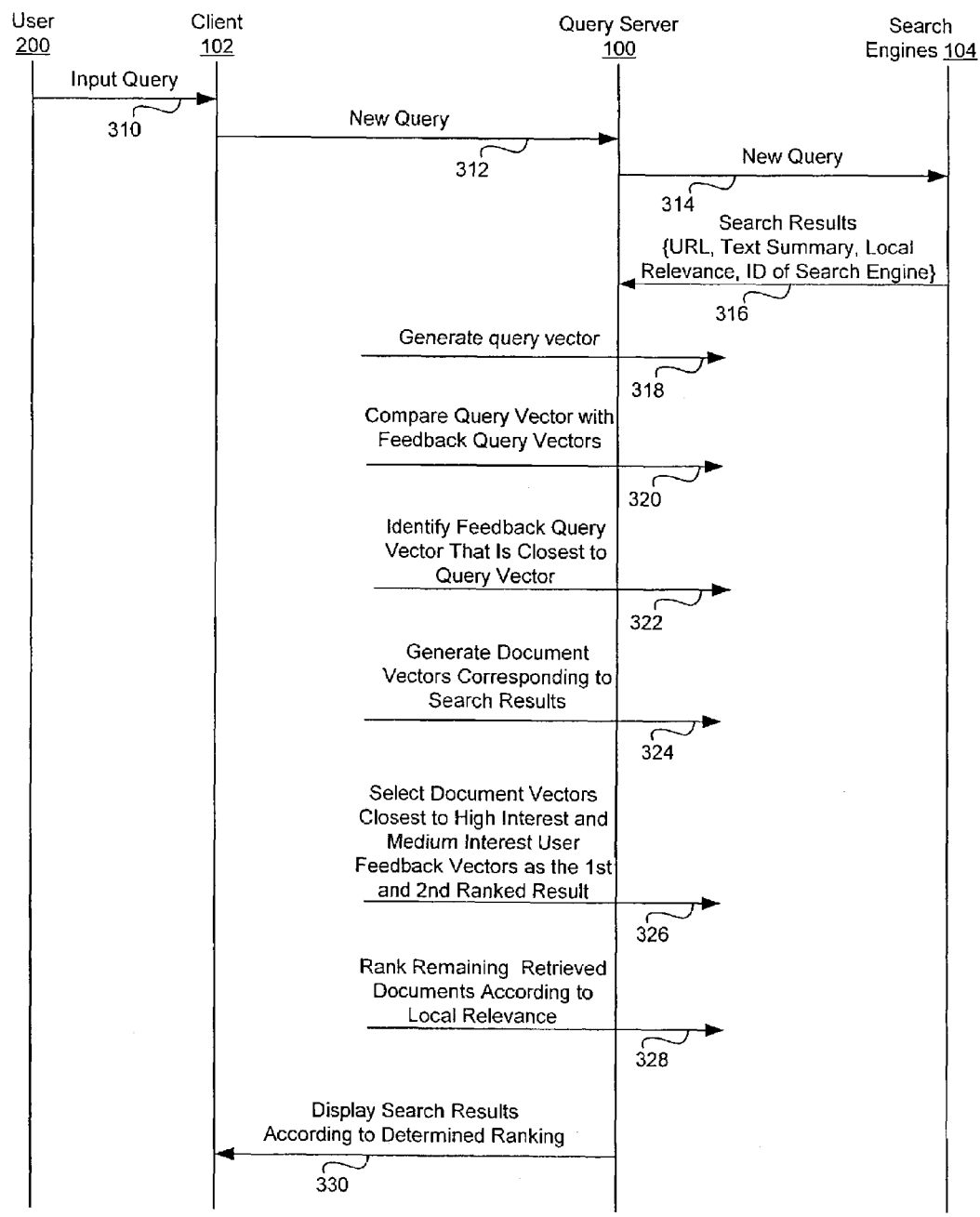
FIG. 3 is an interaction diagram illustrating the method of ranking documents retrieved from a plurality of search engines according to one embodiment of the present invention.

FIG. 3 is an interaction diagram illustrating the method of ranking documents retrieved from a plurality of search engines in response to a query, according to one embodiment of the present invention. As with FIG. 2, FIG. 3 describes interaction among a user 200, the client device 102, a query server 100, and a plurality of search engines 104.

Referring to FIG. 3, the method begins with the user 200 inputting a query 310 to the client device 102. The client 102 passes on the query 312 to the query server 100. The query server 100 in turn passes the query 314 to a plurality of search engines 104 coupled to the query server 100.

The search engines 104 independently search their associated corpus of documents and returns search results 316 to the query server 100. In one embodiment, the search results may include (i) the URLs of the listed documents, (ii) the text summaries of the listed documents, (iii) the local relevance scores of the listed documents, and (iv) identifications of the search engines returning search results.

The query server 100 generates 318 a query vector based upon then input query 310. The input query 310 is typically in the form of a keyword search and can be represented in the form of a query vector $Q=\{q_1, q_2, ..., q_R\}$. The elements $\{q_1, q_2, ..., q_R\}$ in the query vector Q are the weights of the terms in the input query. In a typical keyword search, $q_1, q_2, ..., q_R$ are ones (1) or zeros (0) depending upon whether the corresponding term is included in the input query.

The query server 100 then compares 320 the query vector Q with the feedback query vectors FQ stored in the feedback data storage module 101, as illustrated in FIG. 4, and identifies 322 the feedback query vector(s) FQ that is closest to the query vector Q. Comparison of the query vector Q with the feedback query vectors FQ is carried out by computing the distance between the query vector Q with the feedback query vectors FQ and identifying the feedback query vector FQ with the shortest distance to the query vector Q, i.e., min (|Q−FQ|), with min (|Q−FQ|) being shorter than a predetermined threshold. In another embodiment, the comparison of the query vector Q with the feedback query vectors FQ is carried out by calculating the dot product of the query vector Q and the feedback query vectors FQ divided by the product of the length of the query vector Q and the feedback query vectors FQ. In still another embodiment, the comparison of the query vector Q with the feedback query vectors FQ is carried out by performing a cosine operation between of the query vector Q with the feedback query vectors FQ (a cosine value of 0 means that there are no terms in common and a cosine value of 1 means that every term in both texts has the same weight).

Figure 5A:
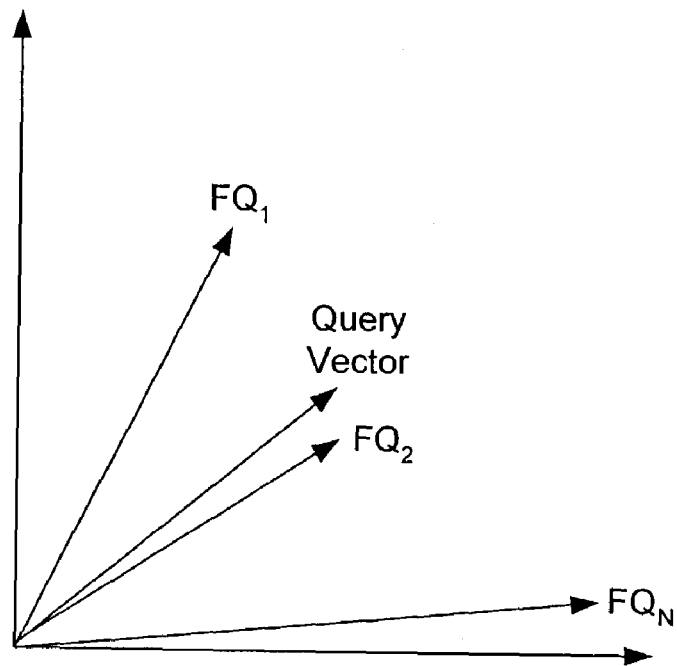
FIG. 5A is a diagram illustrating the steps of comparing the query vector with the feedback query vectors and identifying the feedback query vector closest to the query vector, according to one embodiment of the present invention.

FIG. 5A is a diagram illustrating the steps 320, 322 of comparing the query vector Q with the feedback query vectors FQ and identifying the feedback query vector FQ closest to the query vector Q. As shown in FIG. 5A, the distances between the query vector Q and the feedback query vectors $FQ_i$(i=1, 2, 3, ... N) are calculated and the feedback query vector FQ with the shortest distance to the query vector Q is selected. For example, in FIG. 5A, $FQ_2$ is selected as the feedback query vector closest to the query vector Q.

Referring back to FIG. 3, the query server generates 324 document vectors $D_i$ (i=1, 2, 3, ..., M; M is the number of document vectors) corresponding to the documents in the search results retrieved in response to the query 314. The document vectors $D_i$ are in the form of:

$$D_i = \{d_{i1}, d_{i2}, ..., d_{iR}\}(i=1, 2, 3, ..., M),$$

where R equals the number of terms in the vector space, and each of $\{d_{i1}, d_{i2}, ..., d_{iR}\}$ is a weight corresponding to a term in the document corpus. The weight is preferably a function of the frequency at which the associated term appear in the document and the frequency of the associated term in the corpus. For example, the weights can be the conventional t*IDF formulation, where t is the frequency of the term in the document, and IDF is the inverse document frequency obtained by taking the log of the ratio of the number of documents in the corpus to the document frequency of the term associated with t (i.e., the number of documents in which the term associated with t occurs). A term which occurs in all documents will have inverse document frequency 0. A term which occurs very often in one document but in very few documents of the corpus will have a high inverse document frequency and thus a high t*IDF score, and is thus a strong candidate for being a term that characterizes the content of the document.

The query server 100 selects 326 the document vectors D from the search results of the various search engines 104 that are closest to the high interest user feedback vector HUF and the medium interest user feedback vector MUF associated with the selected closest feedback query vector. This is carried out by identifying the document vectors $D_h$ most similar (closest within a threshold amount) to the high interest user feedback vector HUF and another group of document vectors $D_m$ closest to the medium interest user feedback vector MUF. The query server 100 ranks 328 the documents in the search result, such that the documents corresponding to the document vectors $D_h$ are ranked as the first priority result in the search results and the documents corresponding to the document vectors $D_m$ are ranked as the second priority result in the search results.

Figure 5B:
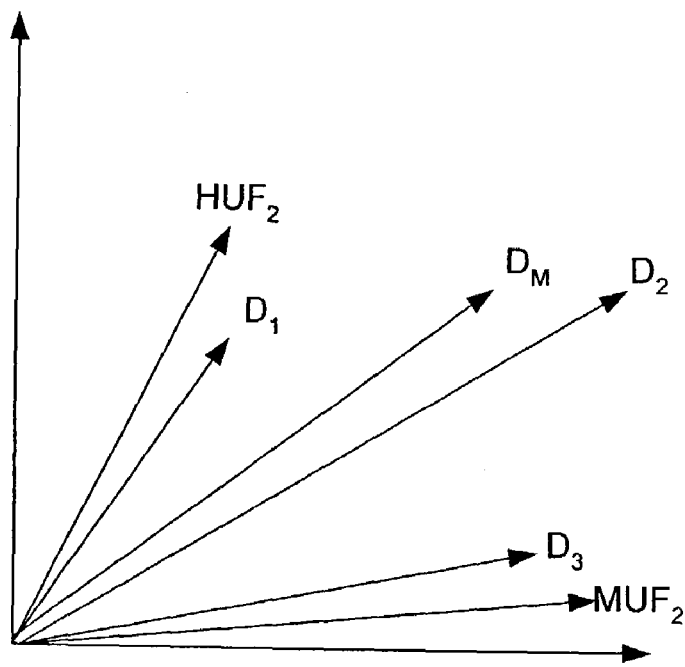
FIG. 5B is a diagram illustrating the step of selecting documents closest to the high interest user feedback vector and the medium interest user feedback vector as the first and second ranked search result according to one embodiment of the present invention.

FIG. 5B is a diagram illustrating the step of selecting documents closest to the high interest user feedback vector HUF and the medium interest user feedback vector MUF as the first and second ranked search result, respectively. As shown in FIG. 5B, the method determines the minimum distance between the document vectors $D_i$ and the high interest user feedback vector HUF and the minimum distance between the document vectors $D_i$ and the medium interest user feedback vector MUF. In the example of FIG. 5B, the document vectors $D_i$ are compared with the high interest user feedback vector $HUF_2$ and the medium interest user feedback vector $MUF_2$ associated with the feedback query vector $FQ_2$ as described in FIG. 4, since $FQ_2$ was selected as the feedback query vector closest to the query vector Q in FIG. 5A. In FIG. 5B, document vector $D_1$ is the document vector closest to the high interest user feedback vector $HUF_2$ and document vector $D_3$ is the document vector closest to the medium interest user feedback vector $MUF_2$. As such, the query server 100 ranks the document corresponding to document vector $D_i$ as the first ranked document in the search results and the document corresponding to document vector $D_3$ as the second ranked document in the search results. However, if there is no document vector D with a distance to the high interest user feedback vector HUF or to the medium interest user feedback vector MUF that is less than a predetermined threshold, then such high interest user feedback vector HUF or the medium interest user feedback vector MUF is not used in ranking the retrieved documents.

In another embodiment, the method of the present invention may be modified to select more than one document vectors D closest to the high interest user feedback vectors HUF and the medium interest user feedback data MUF. In such case, the method ranks such selected documents closest to the high interest user feedback vectors HUF with the first priorities and such selected documents closest to the medium interest user feedback vectors MUF with the second priorities.

Referring back to FIG. 3, the query server 100 ranks 328 the remaining documents in the search results according to their normalized local relevance scores or they may be further ranked using the same method. The ranked documents in the search results are displayed 330 to the client 102 according to the determined rankings. Therefore, the document corresponding to document vectors closest to the high interest user feedback vector HUF will be displayed to the user in a first group with the highest rankings, where the high interest user feedback vector HUF is associated with the feedback query vector FQ closest to the current query. Also, other documents closest to the medium interest user feedback vector MUF will be displayed to the user in a second group with the second highest rankings, where the medium interest user feedback vector MUF is associated with the feedback query vector FQ closest to the current query. Accordingly, the users will be able to review retrieved documents in the order that is most likely to be of interest to the user based upon the user's feedback on documents retrieved in response to a previous query that is most similar to the current query.

Although the present invention has been described above with respect to several embodiments, various modifications can be made within the scope of the present invention. For example, the present invention can be modified to employ more than two user feedback vectors (HUF and MUF) associated with a previous query or to employ merely one user feedback vector. Although the methods of the present invention were described in connection with retrieval of documents, the method can be used for ranking various types of information items in general retrieved in response to queries, such as movies, music, and the like. Although the feedback query vectors, query vectors, user feedback vectors, and document vectors are represented in the form of vectors in one embodiment, they can be modified to be represented by any suitable form of data structure.

The present invention has been described in particular detail with respect to one possible embodiment. Those of skill in the art will appreciate that the invention may be practiced in other embodiments. First, the particular naming of the components, capitalization of terms, the attributes, data structures, or any other programming or structural aspect is not mandatory or significant, and the mechanisms that implement the invention or its features may have different names, formats, or protocols. Further, the system may be implemented via a combination of hardware and software, as described, or entirely in hardware elements. Also, the particular division of functionality between the various system components described herein is merely exemplary, and not mandatory; functions performed by a single system component may instead be performed by multiple components, and functions performed by multiple components may instead performed by a single component.

Some portions of the above description present the feature of the present invention in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or code devices, without loss of generality.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by real time network operating systems.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and displays presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will appear from the description below. In addition, the present invention is not described with reference to any particular programming language. It is appreciated that a variety of programming languages may be used to implement the teachings of the present invention as described herein, and any references to specific languages are provided for disclosure of enablement and best mode of the present invention.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the following claims.

What is claimed is:

1. A method of presenting to a user documents retrieved from a document collection by a plurality of search engines in response to a query, each document represented by a document vector in a vector space derived from terms in the document collection, the method comprising:
   generating from the query a query vector in the vector space;
   comparing the query vector with a plurality of feedback query vectors, each feedback query vector associated with at least one user feedback vector, each user feedback vector indicating an aggregated user interest in documents including terms associated with the user feedback vector;
   determining a feedback query vector that is most similar to the query vector;
   determining at least one document vector that is most similar to the user feedback vector associated with the most similar feedback query vector;
   ranking the retrieved documents by assigning the document associated with the at least one most similar document vector to a priority higher than the priority of remaining retrieved documents; and
   presenting the retrieved documents to the user according to the ranking.

2. The method of claim 1, wherein:
   the user feedback vector comprises a first user feedback vector and a second user feedback vector; and
   determining at least one most similar document vector comprises determining at least one first similar document vector that is most similar to the first user feedback vector and at least one second similar document vector that is most similar to the second user feedback vector.

3. The method of claim 2, wherein:
   the first user feedback vector indicates the user's highest aggregate interest in documents including terms associated with the first user feedback vector;
   the second user feedback vector indicates the user's second highest aggregate interest in documents including terms associated with the second user feedback vector; and
   ranking the retrieved documents comprises ranking the document associated with the at least one first similar document vector at a first highest priority and ranking the document associated with the at least one second similar document vector at a second highest priority.

4. The method of claim 3, wherein the first user feedback vector represents the average of document vectors corresponding to documents of which the user reviewed the full text and the second user feedback vector represents the average of document vectors corresponding to documents of which the user reviewed the summary.

5. The method of claim 1, wherein the retrieved documents have local rankings provided by the search engines, and the method further comprises:
   normalizing the local rankings associated with the documents; and
   ranking the other retrieved documents according to their associated normalized local rankings.

6. The method of claim 1, wherein determining a most similar feedback query vector comprises:
   determining the feedback query vector closest to the query vector and within a predetermined threshold.

7. The method of claim 1, wherein determining at least one most similar document vector comprises:
   determining at least one document vector closest to the user feedback vector and within a predetermined threshold.

8. A system for presenting to a user documents retrieved from a document collection by a plurality of search engines in response to a query, the documents represented by document vectors in a vector space derived from terms in the document collection, the system comprising:
   a user feedback database storing feedback query vectors and user feedback vectors associated with the feedback query vectors, the user feedback vectors indicating the user's aggregate interests in selected documents including terms associated with the user feedback vectors, the selected documents corresponding to one or more of the documents retrieved in response to previous queries corresponding to the feedback query vectors; and
   a processor module coupled to the user feedback database, wherein the processor module:
      generates a query vector based upon the query;
      compares the query vector with the feedback query vectors stored in the user feedback;
      determines a feedback query vector that is most similar to the query vector;
      compares the document vectors with at least one user feedback vector associated with the most similar feedback query vector; and
      determines a document vector that is most similar to the user feedback vector;
      ranks the retrieved documents by assigning the document associated with the most similar document vector to a priority higher than the priority of remaining retrieved documents; and
      presents the retrieved documents to the user according to the ranking.

9. The system of claim 8, wherein:
the user feedback vector comprises a first user feedback vector and a second user feedback vector;
the processor module compares the document vector with the first user feedback vector and the second user feedback vector; and
the processor module determines a first similar document vector that is most similar to the first user feedback vector and a second similar document vector that is most similar to the second user feedback vector.

10. The system of claim 9, wherein the first user feedback vector indicates the user's highest aggregate interest in documents including terms associated with the first user feedback vector and the second user feedback vector indicates the user's second highest aggregate interest in documents including terms associated with the second user feedback vector.

11. The system of claim 9, wherein the first user feedback vector represents the average of document vectors corresponding to documents of which the user reviewed the full text and the second user feedback vector represents the average of document vectors corresponding to documents of which the user reviewed the summary.

12. The system of claim 8, wherein the retrieved documents have local rankings provided by the search engines, and the processor module normalizes the local rankings associated with the documents and further ranks the other retrieved documents according to their associated normalized local rankings.

13. The system of claim 8, wherein the processor module compares the query vector with the feedback query vectors by determining the distance between the query vector and the feedback query vector.

14. The system of claim 13, wherein the processor module determines the most similar feedback query vector by determining the feedback query vector closest to the query vector and within a predetermined threshold.

15. The system of claim 8, wherein the processor module compares the document vectors with at least one user feedback vector by determining the distance between the document vectors and the user feedback vector.

16. The system of claim 15, wherein the processor module determines a most similar document vector by determining the document vector closest to the user feedback vector and within a predetermined threshold.

17. A computer program product stored on a computer readable medium and adapted to perform a method of presenting to a user documents retrieved from a document collection by a plurality of search engines in response to a query, each document represented by a document vector in a vector space derived from terms in the document collection, the method comprising:
generating from the query a query vector in the vector space;
comparing the query vector with a plurality of feedback query vectors, each feedback query vector associated with at least one user feedback vector, each user feedback vector indicating an aggregated user interest in documents including terms associated with the user feedback vector;
determining a feedback query vector that is most similar to the query vector;
determining at least one document vector that is most similar to the user feedback vector associated with the most similar feedback query vector;
ranking the retrieved documents by assigning the document associated with the at least one most similar document vector to a priority higher than the priority of remaining retrieved documents; and
presenting the retrieved documents to the user according to the ranking.

18. The computer program product of claim 17, wherein:
the user feedback vector comprises a first user feedback vector and a second user feedback vector; and
determining at least one most similar document vector comprises determining a first similar document vector that is most similar to the first user feedback vector and a second similar document vector that is most similar to the second user feedback vector.

19. The computer program product of claim 18, wherein:
the first user feedback vector indicates the user's highest aggregate interest in documents including terms associated with the first user feedback vector;
the second user feedback vector indicates the user's second highest aggregate interest in documents including terms associated with the second user feedback vector; and
ranking the retrieved documents comprises ranking the document associated with the first similar document vector at a first highest priority and ranking the document associated with the second similar document vector at a second highest priority.

20. The computer program product of claim 18, wherein the first user feedback vector represents the average of document vectors corresponding to documents of which the user reviewed the full text and the second user feedback vector represents the average of document vectors corresponding to documents of which the user reviewed the summary.

21. The computer program product of claim 17, wherein the retrieved documents have local rankings provided by the search engines, and the method further comprises:
normalizing the local rankings associated with the documents; and
ranking the other retrieved documents according to their associated normalized local rankings.

22. The computer program product of claim 17, wherein determining a most similar feedback query vector comprises:
determining the feedback query vector closest to the query vector and within a predetermined threshold.

23. The computer program product of claim 17, wherein determining at least one most similar document vector comprises:
determining at least one document vector closest to the user feedback vector and within a predetermined threshold.

24. A method of selecting documents retrieved from a document collection by a plurality of a search engines in response to a query, the method comprising:
receiving a query;
comparing the received query with a plurality of feedback queries, each feedback query associated with at least one user feedback data, each user feedback data indicating an aggregated user interest in documents including terms associated with the user feedback;
determining a feedback query that is most similar to the received query;
determining at least one document that is most similar to the user feedback data associated with the most similar feedback query;
selecting the at least one most similar document;

ranking the retrieved documents by assigning the at least one most similar document to a priority higher than the priority of remaining retrieved documents; and presenting the retrieved documents to the user according to the ranking.

25. The method of claim 24, wherein:

the user feedback data comprises a first user feedback data and a second user feedback data; and determining at least one most similar document comprises determining at least one first similar document that is most similar to the first user feedback data and at least one second similar document that is most similar to the second user feedback data.

26. The method of claim 25, wherein:

the first user feedback data indicates the user's highest aggregate interest in documents including terms associated with the first user feedback data;

the second user feedback data indicates the user's second highest aggregate interest in documents including terms associated with the second user feedback data; and selecting the at least one most similar document comprises selecting the at least one first document with a first highest priority and selecting the at least one second document with a second highest priority.

27. The method of claim 26, wherein the first user feedback data corresponds to documents of which the user reviewed the full text and the second user feedback data corresponds to documents of which the user reviewed the summary.

28. A system for selecting documents retrieved from a document collection by a plurality of search engines in response to a query the system comprising:

a user feedback database storing feedback queries and user feedback data associated with the feedback queries, the user feedback data indicating the user's aggregate interests in selected documents including terms associated with the user feedback data, the selected documents corresponding to one or more of the documents retrieved in response to previous queries corresponding to the feedback queries; and a processor module coupled to the user feedback database, wherein the processor module:

receives a query;

compares the received query with a plurality of feedback queries, each feedback query associated with at least one user feedback data, each user feedback data indicating an aggregated user interest in documents including terms associated with the user feedback;

determines a feedback query that is most similar to the received query;

determines at least one document that is most similar to the user feedback data associated with the most similar feedback query;

selects the at least one most similar document;

ranks the retrieved documents by assigning the at least one most similar document to a Priority higher than the Priority of remaining retrieved documents; and presents the retrieved documents to the user according to the ranking.

29. The system of claim 28, wherein:

the user feedback data comprises a first user feedback data and a second user feedback data; and determining at least one most similar document comprises determining at least one first similar document that is most similar to the first user feedback data and at least one second similar document that is most similar to the second user feedback data.

30. The system of claim 29, wherein:

the first user feedback data indicates the user's highest aggregate interest in documents including terms associated with the first user feedback data;

the second user feedback data indicates the user's second highest aggregate interest in documents including terms associated with the second user feedback data; and selecting the at least one most similar document comprises selecting the at least one first document with a first highest priority and selecting the at least one second document with a second highest priority.

31. The system of claim 30, wherein the first user feedback data corresponds to documents of which the user reviewed the full text and the second user feedback data corresponds to documents of which the user reviewed the summary.

32. A computer program product stored on a computer readable storage medium and adapted to perform a method of selecting documents retrieved from a document collection by a plurality of search engines in response to a query, the method comprising:

receiving a query;

comparing the received query with a plurality of feedback queries, each feedback query associated with at least one user feedback data, each user feedback data indicating an aggregated user interest in documents including terms associated with the user feedback;

determining a feedback query that is most similar to the received query;

determining at least one document that is most similar to the user feedback data associated with the most similar feedback query;

selecting the at least one most similar document;

ranking the retrieved documents by assigning the at least one most similar document to a Priority higher than the Priority of remaining retrieved documents; and presenting the retrieved documents to the user according to the ranking.

33. The computer program product of claim 32, wherein:

the user feedback data comprises a first user feedback data and a second user feedback data; and determining at least one most similar document comprises determining at least one first similar document that is most similar to the first user feedback data and at least one second similar document that is most similar to the second user feedback data.

34. The computer program product of claim 33, wherein:

the first user feedback data indicates the user's highest aggregate interest in documents including terms associated with the first user feedback data;

the second user feedback data indicates the user's second highest aggregate interest in documents including terms associated with the second user feedback data; and selecting the at least one most similar document comprises selecting the at least one first document with a first highest priority and selecting the at least one second document with a second highest priority.

35. The computer program product of claim 34, wherein the first user feedback data corresponds to documents of which the user reviewed the full text and the second user feedback data corresponds to documents of which the user reviewed the summary.

* * * * *